United States Patent
Sasaki et al.

(10) Patent No.: US 8,067,919 B2
(45) Date of Patent: Nov. 29, 2011

(54) DRIVE CONTROL SYSTEM OF STEPPING MOTOR AND DRIVE CONTROL METHOD

(75) Inventors: Katsuhiro Sasaki, Niigata (JP); Yuji Oguro, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 287 days.

(21) Appl. No.: 12/444,095

(22) PCT Filed: Sep. 19, 2007

(86) PCT No.: PCT/JP2007/068108
§ 371 (c)(1),
(2), (4) Date: Apr. 2, 2009

(87) PCT Pub. No.: WO2008/053640
PCT Pub. Date: May 8, 2008

(65) Prior Publication Data
US 2010/0072941 A1 Mar. 25, 2010

(30) Foreign Application Priority Data
Oct. 30, 2006 (JP) .................. 2006-294086

(51) Int. Cl.
*H02P 8/00* (2006.01)
*G05B 19/40* (2006.01)

(52) U.S. Cl. ......... 318/696; 318/685; 116/62.1; 116/47; 116/288

(58) Field of Classification Search .................. 318/685, 318/696; 116/62.1, 47, 284–288, DIG. 6, 116/DIG. 35, DIG. 36; 324/139, 143, 144, 324/151 R; 702/142; 73/1.37, 1.88
See application file for complete search history.

(56) References Cited

U.S. PATENT DOCUMENTS
4,297,626 A * 10/1981 Chiang ................ 318/696
6,750,627 B2 * 6/2004 Holdaway .............. 318/696
(Continued)

FOREIGN PATENT DOCUMENTS
JP 56-124945 9/1981
JP 58-109983 6/1983
JP 7-036599 7/1995
(Continued)

OTHER PUBLICATIONS
Machine Translation of JP9140193(A) May 27, 1997 Inventors: Fujimori Norio; Nakane Hideyuki Title: Driver for Stepping Motor and Indicating Instrument.*

*Primary Examiner* — Eduardo Colon Santana
(74) *Attorney, Agent, or Firm* — McDermott Will & Emery LLP

(57) ABSTRACT

A drive control device and a drive control method for a stepping motor are provided to reduce the number of parts and generation of vibration and noise by a stepping motor. The drive control device controls a drive frequency of the stepping motor according to a measurement value inputted. The drive control device includes storage means for storing the resonance frequency of the stepping motor based on its resonance characteristic as an output-inhibited drive frequency and control means for calculating an instruction angle for operating a needle according to the measurement value, acquiring a first drive frequency of the stepping motor, judging whether the first drive frequency is the output-inhibited drive frequency, and deciding the drive frequency by replacing the first drive frequency with the second drive frequency which is lower than the output-inhibited drive frequency if the first drive frequency is the output-inhibited drive frequency.

6 Claims, 3 Drawing Sheets

U.S. PATENT DOCUMENTS

| | | | |
|---|---|---|---|
| 6,956,351 B2 * | 10/2005 | Yamada | 318/685 |
| 7,034,495 B2 * | 4/2006 | Sasaki | 318/685 |
| 7,332,887 B2 * | 2/2008 | Ryuzaki | 318/685 |
| 7,825,619 B2 * | 11/2010 | Matsubara et al. | 318/685 |

FOREIGN PATENT DOCUMENTS

| | | |
|---|---|---|
| JP | 7-298691 | 11/1995 |
| JP | 9-140193 | 5/1997 |
| JP | 2000-352782 | 12/2000 |

\* cited by examiner

DRIVE CONTROL SYSTEM OF STEPPING MOTOR AND DRIVE CONTROL METHOD

RELATED APPLICATIONS

This application is the U.S. National Phase under 35 U.S.C. §371 of International application No. PCT/JP2007/068108, filed on Sep. 19, 2007, which in turn claims the benefit of Japanese Application No. 2006-294086, filed on Oct. 30, 2006, the disclosures of which Applications are incorporated by reference herein.

TECHNICAL FIELD

The present invention relates to a drive control system of a stepping motor used in a pointer-type instrument mounted on a vehicle typified by a motorcar, and a drive control method thereof.

BACKGROUND ART

A drive control system of a stepping motor controls drive frequency of the stepping motor based on a measurement value inputted in a certain period. The stepping motor may generate vibration due to a resonance characteristic (drive frequency versus vibration acceleration characteristic) inherent in the stepping motor, and the vibration is transferred to a component being driven by the stepping motor, inducing resonance of the component, and consequently noise has been a problem. A system is given for solving the problem, which detects vibration of the component, and changes frequency depending on the detected vibration so as to prevent the resonance and the noise (for example, referring to patent document 1).

However, such a prior drive control system of a stepping motor has a problem that the detection means of detecting vibration of the component is necessary, leading to increase in number of components, and increase in cost associated with such increase in number of components. Therefore, a system is given for preventing the resonance and the noise without using the detection means of detecting vibration of a component, in which when drive frequency is within a resonance frequency range, drive current of a stepping motor is controlled to decrease drive force of the stepping motor, so that generation of the resonance and the noise is prevented (for example, referring to patent document 2).

Patent document 1: JP-A-7-298691
Patent document 2: JP-A-9-140193

DISCLOSURE OF THE INVENTION

Problems that the Invention is to Solve

However, such a prior drive control system of a stepping motor has a problem that since drive current is controlled, control becomes complicated.

Therefore, to cope with the problem, an object of the invention is to provide a drive control system of a stepping motor and a drive control method thereof, which can suppress increase in number of components, and suppress generation of vibration and noise due to the stepping motor by means of simple control.

Means for Solving the Problems

To achieve the above object, according to the invention, there is provided a drive control system for a stepping motor which controls drive frequency of the stepping motor based on a measurement value inputted in a certain period, the system comprising: storage means that stores resonance frequency of the stepping motor as an output-inhibited drive frequency, the resonance frequency being depending on a resonance characteristic of the stepping motor; and control means that calculates a pointing angle for operation of a pointer and obtains a first drive frequency of the stepping motor based on the measurement value, then determines whether or not the calculated first drive frequency corresponds to the output-inhibited drive frequency, and when the first drive frequency corresponds to the output-inhibited drive frequency, replaces the first drive frequency with a second drive frequency which is lower than the output-inhibited drive frequency to determine the drive frequency.

Also, in the invention, the control means obtains the pointing angle by using an angle difference from a previous value.

Further, in the invention, the output-inhibited drive frequency is modified depending on a resonance characteristic of the stepping motor.

Further, according to the invention, there is provided a drive control method for a stepping motor which controls drive frequency of the stepping motor based on a measurement value inputted in a certain period, the method comprising: determining an output-inhibited drive frequency based on a resonance characteristic of the stepping motor; calculating a pointing angle for operation of a pointer and obtaining a first drive frequency of the stepping motor based on the input value; determining whether or not the calculated first drive frequency corresponds to the output-inhibited drive frequency; and replacing the first drive frequency with a second drive frequency equal to or lower than the output-inhibited drive frequency to determine the drive frequency when the first drive frequency corresponds to the output-inhibited drive frequency.

Further, in the invention, the pointing angle is obtained by using a difference from a previous value.

Further, in the invention, the output-inhibited drive frequency is modified depending on a resonance characteristic of the stepping motor.

Advantage of the Invention

According to the invention, there can be provided the intended object can be achieved, and a drive control system of a stepping motor and a drive control method thereof, which can suppress increase in number of components, and suppress generation of vibration and noise due to the stepping motor by means of simple control.

Figure 1:
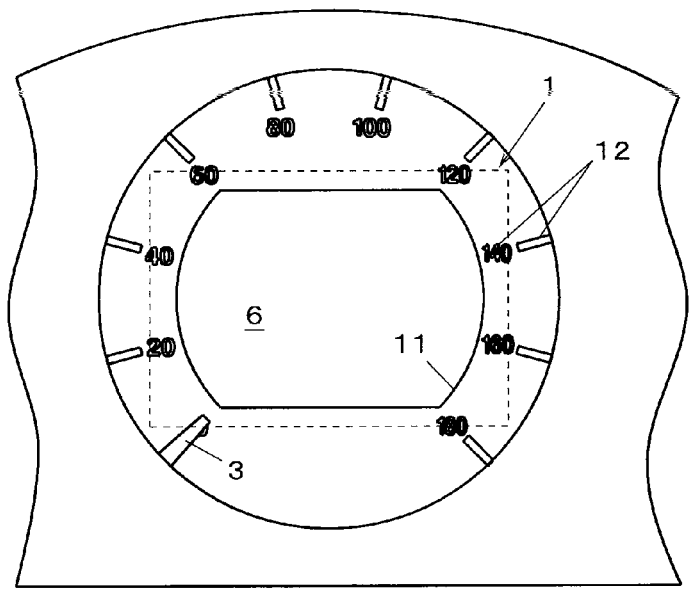
FIG. 1 It is a front view of a pointer-type instrument of a first embodiment of the invention.

DESCRIPTION OF THE REFERENCE NUMERALS AND SIGNS 1 index plate
2 circular movable member
3 pointer 4 frame member
5 stepping motor
6 display device
7 microcomputer (control means)
8 storage means
9 drive circuit
11 see-through portion
12 index portion
21 gear array
41 through portion
42 support member
51 drive shaft
52 rotational member
53 gear array (second gear array)
54 coil
55 coil
56 magnet rotor

BEST MODE FOR CARRYING OUT THE INVENTION

According to the invention, a drive control system is provided for a stepping motor 5 which controls drive frequency of the stepping motor 5 based on a measurement value inputted in a certain period, the system comprising: storage means 8 that stores resonance frequency of the stepping motor 5 as an output-inhibited drive frequency, the resonance frequency being depending on a resonance characteristic of the stepping motor 5; and control means 7 that calculates a pointing angle for operation of a pointer and obtains a first drive frequency of the stepping motor 5 based on the measurement value, then determines whether or not the calculated first drive frequency corresponds to the output-inhibited drive frequency, and when the first drive frequency corresponds to the output-inhibited drive frequency, replaces the first drive frequency with a second drive frequency lower than the output-inhibited drive frequency to determine the drive frequency. With the above configuration, the drive control system and the drive control method for a stepping motor can be provided, which can suppress increase in number of components, and suppress generation of vibration and noise due to the stepping motor by means of simple control.

Also, the control means 7 obtains the pointing angle by using a difference from a previous value. With the above configuration, there can be provided the drive control system and the drive control method for a stepping motor, which can suppress increase in number of components, and suppress generation of vibration and noise due to the stepping motor by means of simple control. Also, a drive control device can be provided for a stepping motor which can realize the pointing operation that is smooth and suppresses generation of vibration and noise, which is a pointing angle calculating method for obtaining continuous smooth pointing angles from the measurement values inputted in a certain period.

Further, in the invention, the output-inhibited drive frequency is modified depending on a resonance characteristic of the stepping motor 5. With the above configuration, a drive control system and a drive control method can be provided for a stepping motor, which can suppress an increase in number of components, and suppress generation of vibration and noise due to the stepping motor by means of simple control. Also, there can be provided a drive control system for a stepping motor, which can suppress a generation of vibration and noise by merely modifying the output-inhibited drive frequency when a stepping motor that is different in the resonance frequency is used.

Further, according to the invention, there is provided a drive control method for a stepping motor which controls drive frequency of the stepping motor based on a measurement value inputted in a certain period, the method comprising: determining an output-inhibited drive frequency based on a resonance characteristic of the stepping motor; calculating a pointing angle for operation of a pointer and obtaining a first drive frequency of the stepping motor based on the input value; determining whether or not the calculated first drive frequency corresponds to the output-inhibited drive frequency, and when the first drive frequency corresponds to the output-inhibited drive frequency, replacing the first drive frequency with a second drive frequency equal to or lower than the output-inhibited drive frequency to determine the drive frequency. With the above configuration, the drive control system and the drive control method for a stepping motor can be provided, which can suppress increase in number of components, and suppress generation of vibration and noise due to the stepping motor by means of simple control.

Further, the pointing angle in the invention is obtained by using a difference from a previous value. With the above configuration, there can be provided the drive control system and the drive control method for a stepping motor, which can suppress increase in number of components, and suppress generation of vibration and noise due to the stepping motor by means of simple control. Also, there can be provided a drive control method for a stepping motor which can realize the pointing operation that is smooth and suppresses generation of vibration and noise, which is a pointing angle calculating method for obtaining continuous smooth pointing angles from the measurement values inputted in a certain period.

Further, in the invention, the output-inhibited drive frequency is modified depending on a resonance characteristic of the stepping motor 5. With the above configuration, there can be provided a drive control system and a drive control method for a stepping motor, which can suppress increase in number of components, and suppress generation of vibration and noise due to the stepping motor by means of simple control. Also, there can be provided a drive control method for a stepping motor, which can suppress generation of vibration and noise by merely changing the output-inhibited drive frequency when a stepping motor different in the resonance frequency is used.

EMBODIMENT 1

Hereinafter, a drive control system of a stepping motor and a drive control method thereof according to the invention are described using a pointer-type instrument according to drawings.

Figure 2:
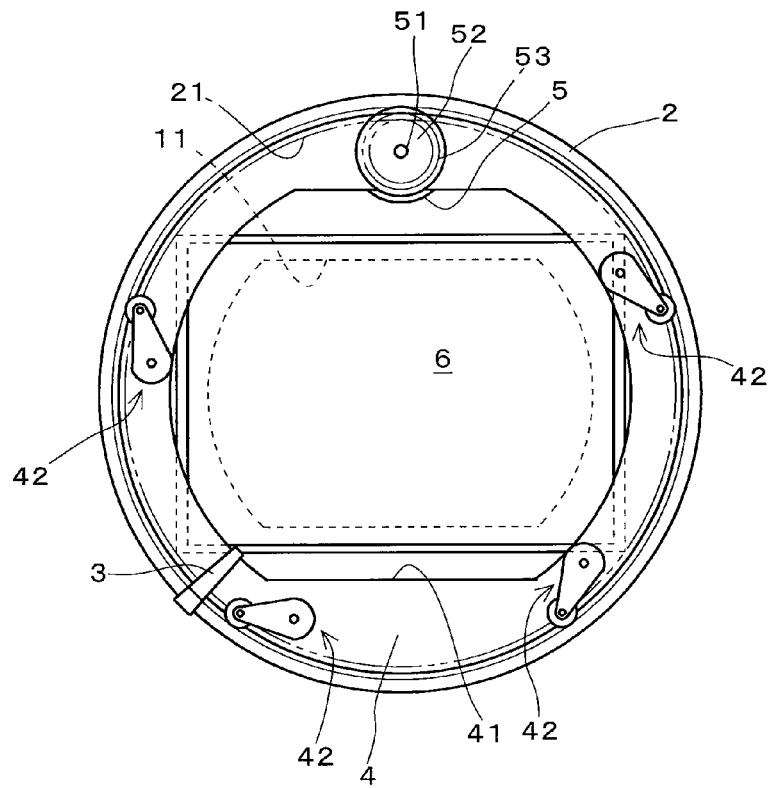
FIG. 2 It is a front view of the pointer-type instrument of FIG. 1 when an index plate is removed.
Figure 3:
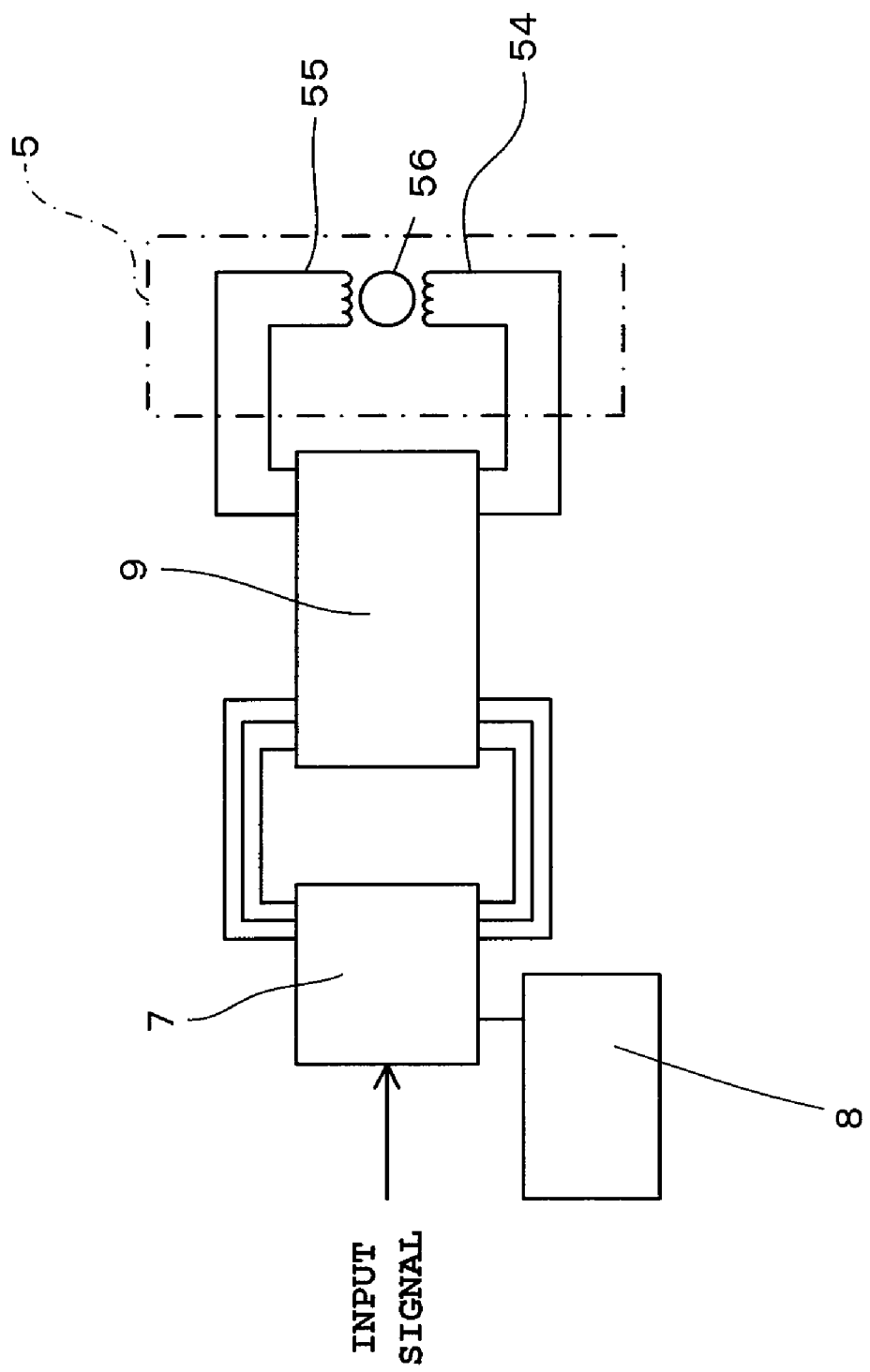
FIG. 3 It is a block diagram of a drive control system of a stepping motor of the embodiment.

A pointer-type instrument in the embodiment points speed of a vehicle by a pointer. As shown in FIGS. 1 and 2, the instrument has an index plate 1, a circular movable member 2 arranged behind the index plate 1, a pointer 3 mounted on the circular movable member 2, a flame member 4 disposed behind the circular movable member 2, a stepping motor 5 for rotationally moving the circular movable member 2, and a display device 6 for displaying predetermined information to an observer.

The index plate 1 has a see-through portion 11 including a deformed rectangular through-hole having arcuate, horizontal two sides in approximately central region, and has index portions 12 of letters and scales arranged arcuately along a moving path of the pointer 3 in the periphery of the see-through portion 11.

The circular movable member 2 includes synthetic resin, and is formed in a closed ring shape. On an inner circumferential face of the member 2, the member has a gear array 21 to be engaged with a later-described rotational member being driven through the stepping motor 5.

The pointer 3 includes synthetic resin, and is linearly formed. The pointer is fixedly mounted on the circular movable member 2 such that a tip of the pointer is directed to a rotational center side of the member 2, and rotates with the circular movable member 2 to point an index portion 12.

The frame member 4 includes metal, and has an approximately circular shape having a through portion 41 corresponding to the see-through portion 11 of the index plate 1 and to the display device 6. The frame member 4 has support members 42 which are disposed with an interval in a rotational direction such that the members 42 support the circular movable member 2 in a manner of contacting to an inner circumferential face of the member 2.

The stepping motor 5 is a PM stepping motor having a claw pole structure including a two-phase coil, and is driven by a one-two-phase excitation method. A drive shaft 51 extends forward through the frame member 4, and is mounted with a rotational member 52.

The rotational member 52 includes synthetic resin, and has a gear array 53, which is engaged with the gear array 21 of the circular movable member 2, on the periphery of the member 52. The rotational member 52 is fixed to the drive shaft 51 so as to rotate with the drive shaft.

The display device 6 includes, for example, a liquid crystal display device, and is provided in a manner of facing the through portion 11 of the index plate 1, and displays measurement information including travel distance data or ambient temperature data, and displays navigation information.

In the pointer-type instrument of the embodiment configured in this way, the drive shaft 51 of the stepping motor 5 is set to rotate depending on measured amount, and when the rotational member 52 rotates with rotation of the drive shaft 51, the circular movable member 2, having the gear array 21 being engaged with the gear array 53 of the rotational member 52, rotationally moves, so that the pointer 3 provided on the circular movable member 2 points an index portion 12 in the periphery of the through portion 11 opposed to the display device 6.

Next, a drive control system of the stepping motor 5 and a drive control method thereof are described.

The drive control system of the stepping motor 5 has the stepping motor 5, a microcomputer 7 as control means, storage means 8, and a drive circuit 9.

Since the stepping motor 5 is a PM stepping motor having a two-phase coil in the embodiment, the stepping motor has two coils 54 and 55, and a magnet rotor 56. The magnet rotor 56 is freely rotationally supported by the drive shaft 51.

The microcomputer 7 is connected to a plus terminal of a battery as a power supply via a not-shown ignition switch of a vehicle. The microcomputer 7 executes a computer program shown by a flowchart described later, and performs arithmetic processing for controlling the drive circuit 9 connected to the stepping motor 5.

The storage means 8 is ROM such as EEPROM, which may electrically rewrite contents. The storage means 8 stores drive patterns corresponding to respective pointing angles obtained through the arithmetic processing by the microcomputer 7, and a resonance frequency of the stepping motor 5 corresponding to an output-inhibited frequency. The stored drive patterns include drive frequencies for driving the stepping motor 5, including frequencies being 100 PPS (Pulse Per Second), 200 PPS, and 300 PPS to 1000 PPS in increments of 100 PPS. Moreover, since the resonance frequency of the stepping motor 5 of the embodiment is conspicuous near 200 PPS, 200 PPS is stored as the resonance frequency. The storage means 8 such as EEPROM, which may electrically rewrite contents is used, thereby the output-inhibited drive frequency can be modified depending on a resonance characteristic of the stepping motor 5.

The drive circuit 9 is controlled by the microcomputer 7 to flow a sine-wave current to the coil 54, and flow a cosine-wave current to the coil 55.

Figure 4:
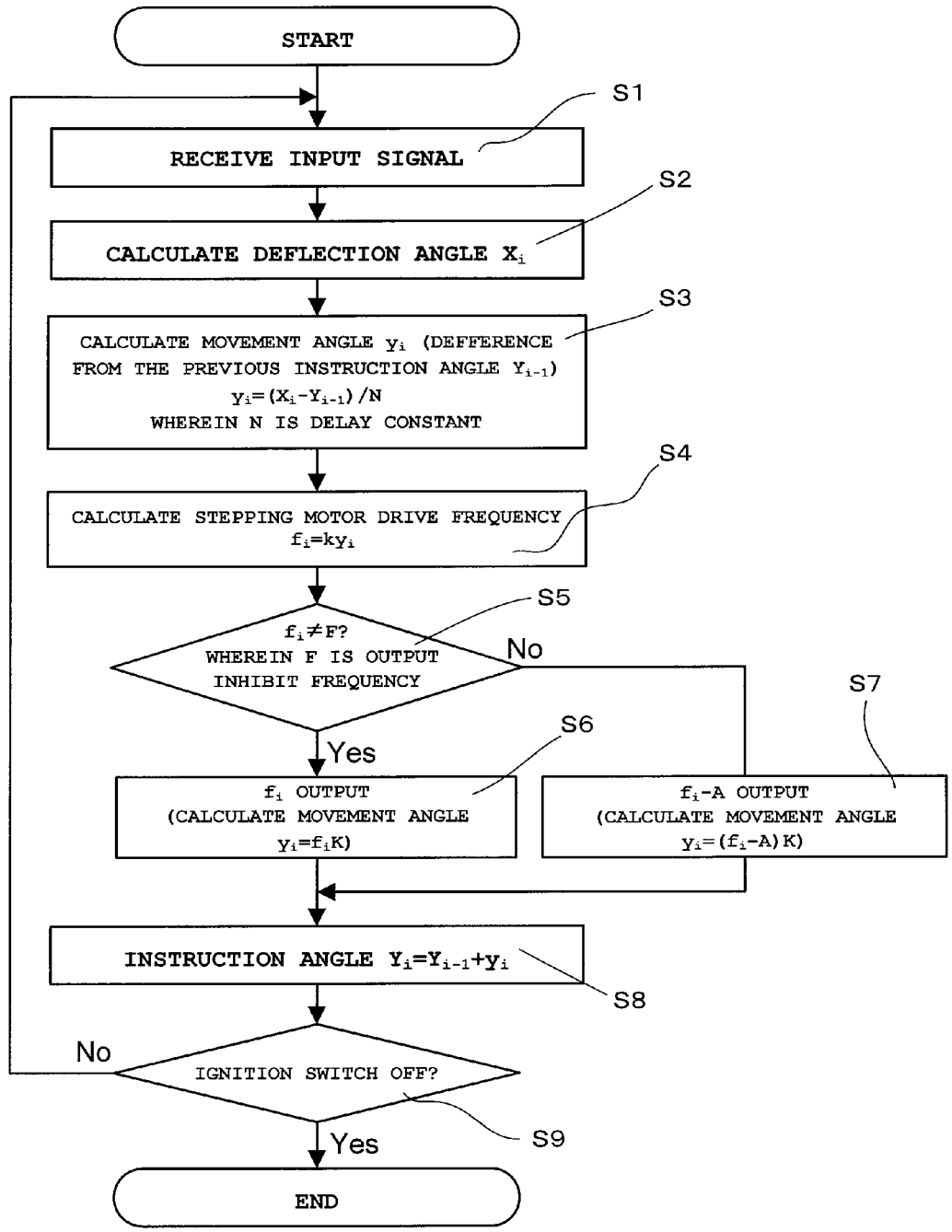
FIG. 4 It is a flowchart showing a drive control method of the stepping motor of the embodiment.

Hereinafter, the drive control method of the stepping motor 5 is described using a flowchart of FIG. 4.

In step S1, the microcomputer 7 receives an input signal showing a measurement value from a speed sensor of a vehicle having the pointer-type instrument.

In step S2, the microcomputer 7 performs calculation to obtain a deflection angle $X_i$ of the pointer 3 based on the measurement value shown by the input signal.

In step S3, the microcomputer 7 obtains a movement angle $y_i$. A formula for obtaining the movement angle $y_i$ is given as follows: movement angle $y_i=(X_i-Y_{i-1})/N$. The microcomputer 7 obtains a difference between a deflection angle $X_i$ and a previous pointing angle $Y_{i-1}$, and thereby obtains a movement angle $y_i$ by which the pointer 3 moves. In the embodiment, delay processing is performed to smoothly move the pointer 3 (N: delay constant).

In step S4, the microcomputer 7 calculates a first drive frequency $f_i$ of the stepping motor 5. A formula for obtaining the first drive frequency $f_i$ is given as follows: $f_i=k\times y_i$. k is a coefficient for converting moving speed in a unit time into drive frequency of the stepping motor.

In step S5, the microcomputer 7 determines whether the first drive frequency $f_i$ corresponds to an output-inhibited frequency F being the resonance frequency of the stepping motor 5. When the first drive frequency $f_i$ does not correspond to the output-inhibited frequency F, processing proceeds to step S6, and when the frequency $f_i$ corresponds to the output-inhibited frequency F, processing proceeds to step S7.

In step S6, the microcomputer 7 selects the first drive frequency $f_i$ as a drive frequency, and calculates the movement angle $y_i$ from the first drive frequency $f_i$ and a coefficient K. A formula for obtaining the movement angle $y_i$ is given as follows: movement angle $y_i=f_i\times K$. K is a coefficient for obtaining the movement angle.

In step S7, the microcomputer 7 replaces the first drive frequency $f_i$ with a second drive frequency $f_i-A$ different from the first drive frequency $f_i$, and calculates the movement angle $y_i$ from the second drive frequency $f_i-A$ and the coefficient K. A formula for obtaining the movement angle $y_i$ is given as follows: movement angle $y_i=(f_i-A)\times K$. The second drive frequency $f_i-A$ is smaller in drive frequency by a value of A compared with the first drive frequency $f_i$. Specifically, in the case that the first drive frequency $f_i$ is the same as the output-inhibited frequency F, 200 PPS, for the second drive frequency $f_i-A$ lower than the first drive frequency $f_i$, frequency is changed from 200 PPS to 100 PPS being one step lower than 200 PPS in the stored drive patterns, and the movement angle $y_i$ is calculated.

In step S8, a pointing angle $Y_i$ is calculated from the sum of a previous pointing angle $Y_{i-1}$ and the movement angle $y_i$ calculated in the step S6 or the step S7. A formula for obtaining the pointing angle $Y_i$ is given as follows: pointing angle $Y_i=Y_{i-1}+y_i$.

While $Y_i$ calculated in the step S8 sometimes is different from the deflection angle $X_i$ calculated in the step S2, arithmetic processing from the step S1 to the step S8 is repeatedly performed, thereby the pointing angle $Y_i$ gradually approximates to the deflection angle $X_i$.

When processing in the step S8 is finished, whether the ignition switch is off or not is determined in step S9. When the ignition switch is not off, processing is returned to the step S1, and when the ignition switch is off, processing is finished.

As hereinbefore, a drive control system of the stepping motor 5 determines whether the calculated first drive frequency $f_i$ corresponds to the output-inhibited drive frequency, and when the first drive frequency $f_i$ corresponds to the output-inhibited drive frequency, the frequency $f_i$ is replaced with the second drive frequency $f_i-A$ lower than the output-inhibited drive frequency. Thus, a drive control system of the stepping motor 5 and a drive control method thereof can be provided, which can suppress an increase in number of components, and suppress a generation of vibration and noise due to the stepping motor 5 by means of simple control.

In the embodiment, the stepping motor 5 was a PM stepping motor having a claw pole structure and including a two-phase coil, and was driven by a one-two-phase excitation method. However, in the practice of the invention, the PM stepping motor is not limitedly used, and for example, a hybrid-type stepping motor may be used. Moreover, a drive method is not limited to the one-two-phase excitation method, and a one-phase excitation method or a two-phase excitation method may be used.

INDUSTRIAL APPLICABILITY

The invention is preferably used for a pointer-type instrument for a vehicle, which uses a stepping motor to measure and point measurement amount such as travel speed or engine rotational speed based on a frequency signal inputted in proportion to the measurement amount.

The invention claimed is:

1. A drive control system for a stepping motor which controls a drive frequency of the stepping motor based on a measurement value inputted in a certain period, the drive control system comprising:
    storage means that stores at least a resonance frequency of the stepping motor as an output-inhibited drive frequency, the resonance frequency being determined by a resonance characteristic of the stepping motor; and
    control means that is connected to the storage means, wherein the control means calculates a pointing angle for operation of a pointer and a first drive frequency of the stepping motor based on the measurement value, determines whether the first drive frequency corresponds to the output-inhibited drive frequency obtained from the storage means, and, when the first drive frequency corresponds to the output-inhibited drive frequency, replaces the first drive frequency with a second drive frequency lower than the output-inhibited drive frequency to determine the drive frequency of the stepping motor.

2. The drive control system for a stepping motor according to claim 1, wherein the control means obtains the pointing angle by using a difference from a previous pointing angle.

3. The drive control system for a stepping motor according to claim 1, wherein the output-inhibited drive frequency is modified depending on the resonance characteristic of the stepping motor.

4. A drive control method for a stepping motor which controls a drive frequency of the stepping motor based on a measurement value inputted in a certain period, the drive control method comprising:
    determining an output-inhibited drive frequency based on a resonance characteristic of the stepping motor stored in a storage means;
    calculating a pointing angle for operation of a pointer and a first drive frequency of the stepping motor based on the inputted measurement value;
    determining whether or not the calculated first drive frequency corresponds to the output-inhibited drive frequency; and
    when the first drive frequency corresponds to the output-inhibited drive frequency, replacing the first drive frequency with a second drive frequency which is lower than the output-inhibited drive frequency to determine the drive frequency of the stepping motor.

5. The drive control method for a stepping motor according to claim 4, wherein the pointing angle is obtained by using a difference from a previous pointing angle.

6. The drive control method for a stepping motor according to claim 4, wherein the output-inhibited drive frequency is modified depending on the resonance characteristic of the stepping motor.

* * * * *